United States Patent [19]
Scop et al.

[11] Patent Number: 5,638,378
[45] Date of Patent: Jun. 10, 1997

[54] METHOD OF OPERATING A COMMUNICATION SYSTEM

[75] Inventors: Shlomo Scop, Netanya; Haim Geller, Modi'in; Yaron Klein, Raanana, all of Israel

[73] Assignee: Motorola, Inc., Schaumburg, Ill.

[21] Appl. No.: 570,926

[22] Filed: Dec. 12, 1995

[30] Foreign Application Priority Data

Dec. 22, 1994 [GB] United Kingdom ............... 9425948

[51] Int. Cl.$^6$ ................. H04L 12/407; H04L 12/427
[52] U.S. Cl. ................. 370/445; 370/310; 395/287
[58] Field of Search .................. 370/329, 347, 370/445, 459, 462, 310; 395/287, 299; 544/34.1, 58.2

[56] References Cited

U.S. PATENT DOCUMENTS

| | | | |
|---|---|---|---|
| 5,086,507 | 2/1992 | Mela | 455/541 |
| 5,436,901 | 7/1995 | Koopman | 370/462 |
| 5,481,541 | 1/1996 | Gareh et al. | 370/462 |

FOREIGN PATENT DOCUMENTS

| | | |
|---|---|---|
| 9425948.8 | 12/1994 | United Kingdom . |
| 0271582 | 3/1995 | United Kingdom . |

*Primary Examiner*—Hassan Kizou
*Attorney, Agent, or Firm*—Christopher P. Moreno

[57] ABSTRACT

A communications system is described having a number of communicating units arranged for communication over a common communications channel. A first communicating unit (10) transmits a data transmission (104) followed by an end-of-data indication (102) and a predetermined period of further transmission activity (101) to a second communicating unit (12). During the period of further transmission activity (101) of the first unit, the second unit seizes the channel (103) and transmits a preamble (105) prior to its response data. This process continue ensuring that periods of further transmission activity (101) and the preamble (105) keep the channel open for the duration of the communication, for sole use by the communicating units. The invention is applicable to, but not limited to use in supervisory control and acquisition-of-data (SCADA) systems.

8 Claims, 2 Drawing Sheets

METHOD OF OPERATING A COMMUNICATION SYSTEM

FIELD OF THE INVENTION

This invention relates to a communications systems for at least data communications having at least two remote units arranged for communication over a common communications channel. The invention is applicable to, but not limited to use in LAN systems and supervisory control and acquisition-of-data (SCADA) systems.

BACKGROUND TO THE INVENTION

Many communications systems use contention mode as a means of allowing access to the communication channels such as radio, LAN etc. In communications systems operating contention mode access schemes much effort has been directed at improving channel access by fast, fair and efficient manners.

Typical channel accessing techniques that exist are based on monitoring of the channel before contention. Some techniques are based on the use of control channels to allocate a particular time slot for a user. In voice communication systems it is known that synchronization signals can be intermittently transmitted on a communications channel in an attempt to keep the communications channel open, thereby avoiding any collision.

One form of contention mode termed global interrogation or "polling" operates on SCADA systems where communications exist over one particular communications medium. The SCADA system comprises a number of remote terminal units (RTUs), which may be fixed or mobile radio units that are polled by a central communications unit. Typically in such a system, each RTU is allocated a different time period during which to sense a free channel before transmitting a reply. The highest priority RTU is allocated the shortest time for reply. Thus, when the channel becomes free, after the central unit has polled the RTUs, it will be the highest priority unit that is allowed to access the channel first. The next priority unit has to wait a longer period to sense a free channel before it attempts to access the channel. In this manner there is an orderly sequence for response from all the RTUs. However, this arrangement has been found to be wasteful of channel time.

Modern communication protocols consist of "session" type transmissions as well as one way messages, i.e. one party of the system is talking to another party and the responding party replies using the same communications medium. The communication continues between the two parties on the chosen communications media until the session is ended. The problem of using session mode in the contention environment is that users on other systems have access to the same media and communications channels but may not use the same contention algorithms. Hence, these "third parties" attempt to, and succeed in, interrupting "on going" sessions.

There is therefore a need for a method of allowing "sessions" between two units on a particular media channel to continue their communication to completion, whilst precluding other units from accessing that channel.

SUMMARY OF THE INVENTION

According to the present invention, a method is provided for operating a communication system comprising at least first and second communicating units arranged for communication over a communications channel. The method comprises the steps of: at the first unit, transmitting data followed by an end-of-data indication, followed at least by a predetermined period of further transmission activity and at the second unit, detecting the end-of-data indication and commencing transmission in reply to the first unit during this period of further transmission activity.

The invention is applicable to any communications system where many users share communications channels e.g. radio, LAN, WAN etc. or where contention mode is used when units wish to access a channel. The invention is preferably employed in a data radio communications system and the channel is preferably a radio channel.

The invention has the advantage that although the first transmission is based on contention, the party that responds, detects (in real time) the fact that the initiator's transmission is about to end, and the responding party can therefore start its transmission before the initiator's transmission stops. This approach offers the advantage that the system does not allow any other user the opportunity to access the channel that is in use, thereby avoiding contention and an interruption of the session.

Data transmission is preferably carried out in reply after the end of the further transmission activity of the first unit.

The commencement of transmission of the second unit preferably does not include valid data until a period has expired approximately equal to the period of further transmissions of the first unit.

A preferred embodiment of the invention will now be described, by way of example, with reference to the drawings.

DETAILED DESCRIPTION OF THE DRAWINGS

Figure 1:
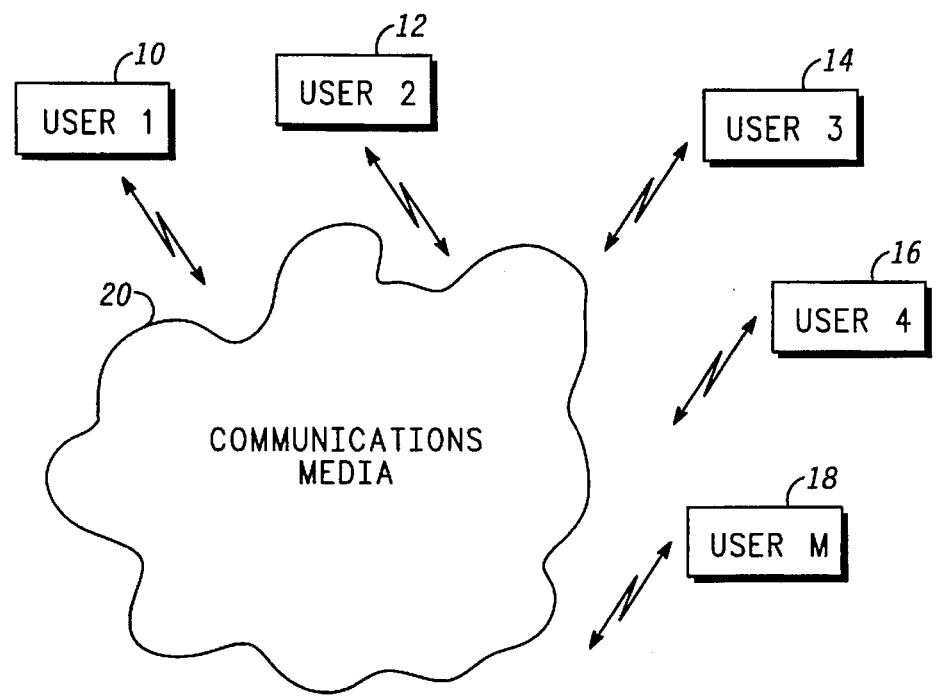
FIG. 1 shows a communications system comprising a number of communications media, being accessed by a number of communications terminals in accordance with the preferred embodiment of the invention.

Referring first to FIG. 1, a communications system is shown. A number of communications units 10, 12, 14, 16 and 18 access channels on the communications media 20. The communications system uses contention mode as a means of allowing access to the channels.

Figure 2:
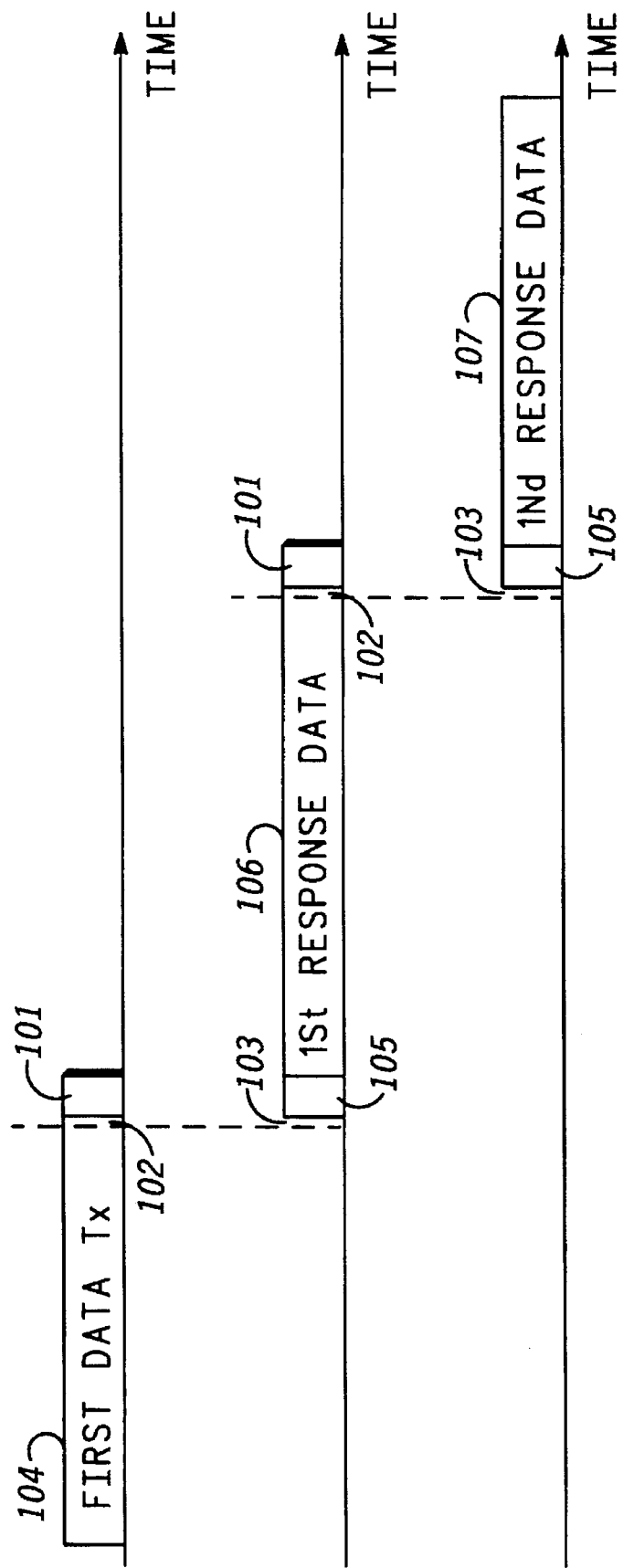
FIG. 2 shows a timing diagram illustrating the operation of the communications system.

FIG. 2 shows a timing diagram that illustrates the operation of the communications system of FIG. 1. A first communications unit 10 initiates a communications link with a second communications unit 12. The first unit 10 transmits a data transmission 104 followed by an end-of-data indication 102 and a "tail" transmission 101 of carrier signal. The responding party i.e. the second unit 12, senses the end-of-data indication 102. The "sensing" operation is performed in the link layer (being a term well understood in the art) of the communication protocol. On sensing the end-of-data indication 102 the second unit 12 "seizes" the channel 103 and starts transmissions, whilst the tail transmission 101 of the first unit 10 is still "ON". The transmission of the second unit 12 comprises a short preamble 105 of activity transmissions, the duration of which is dictated by the communications medium and the information data rate. After a short delay, the second unit 12 assumes that the first unit 10 has finished its tail transmission 101 and starts to transmit its own data 106. The first unit 10 receives the response data 106 from the second unit 12 and senses the end-of-data indication 102 of the response. Should the first unit 10 wish to reply, it seizes the channel 103 and starts transmissions, whilst the tail transmission 101 of the second unit 12 is still "ON". This process repeats itself by sending data 107, until the session is completed. In FIG. 2 the periods of data transmissions 104, 106 and 107 etc. are of flexible length. These periods of data transmissions 104, 106 and 107 with the periods of activity transmissions of the tail transmission 101 and the preamble 105 are not drawn to scale.

Advantageously to the users, this process ensures that no "third party" can contend for the channel, as at no time do other users detect the channel as free and consequently attempt to access it.

The length of the tail transmissions 101 and the preambles 105 are dependent upon the communications medium 20 chosen as well as the information data rate. In conventional radio systems operating at VHF and UHF with data rates of 2400 bits per second to 9600 bits per second, the tail transmission 101 is about 30 to 50 msec. in length. In a data radio environment (at say, 900 MHz) the tail transmission 101 is about 5 to 10 msec. in length whereas in a LAN environment the tail transmission 101 is of the order of a few microseconds.

Thus the period between commencement of transmission in reply and commencement of data transmission (preamble time) is selectable depending upon the reply required and the period of further activity (transmission tail) used by a communicating unit is selectable depending upon the reply expected.

The nature of the communication messages and the data rates dictate the transmission tail lengths 101 and the preambles 105 used by the two communicating units 10 and 12. In the preferred embodiment, the transmission tail lengths 101 and the preambles 105 vary in length during the communication and are of different lengths between the two units. This offers the communications link the advantage of adapting the period of activity transmissions according to the type of messages being transferred and the data rates being used. This is advantageous in situations where processing of the transmitted information is required before a simple acknowledgement is re-transmitted to the sender.

Figure 3:
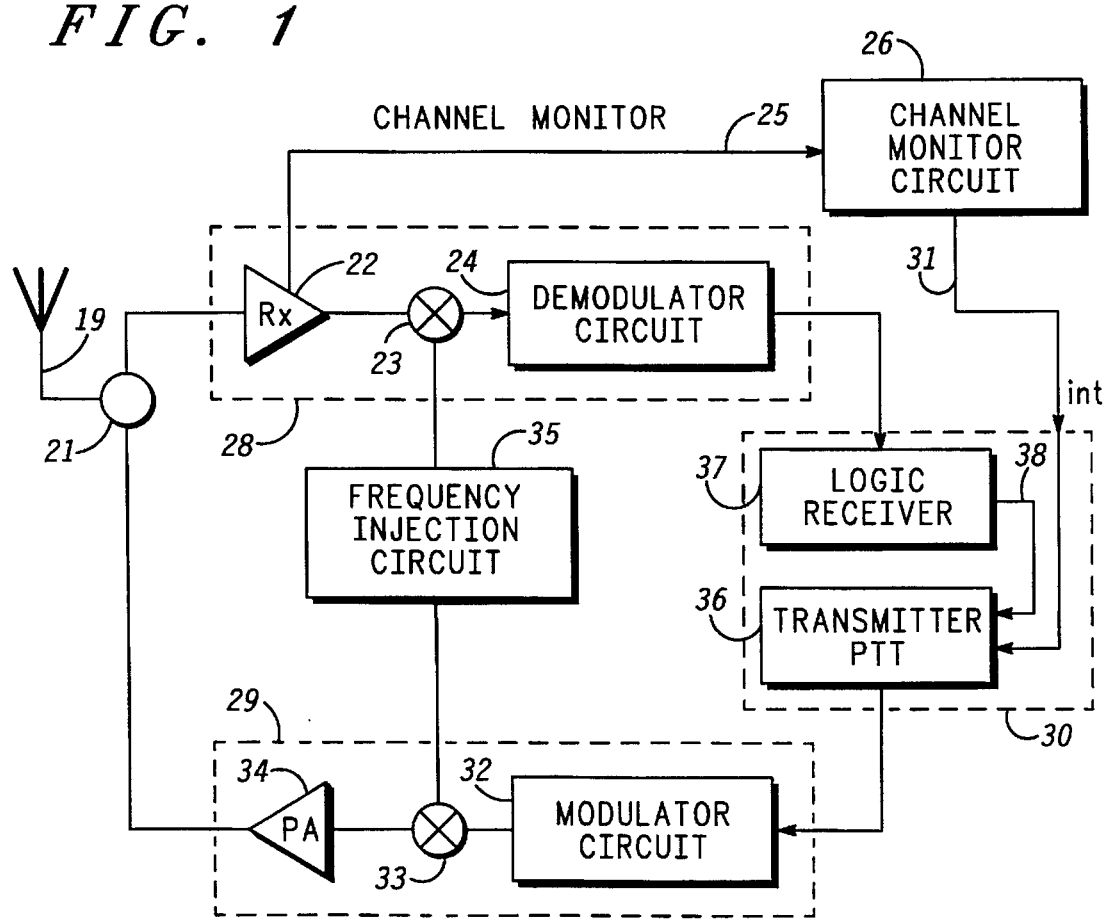
FIG. 3 shows details of a remote unit of FIG. 1 in accordance with the preferred embodiment of the invention.

FIG. 3, shows a preferred embodiment of an RTU design. The RTU comprises an antenna 19 connected to an antenna switch or circulator 21 connected in turn to a receiver part 28 comprising, for the purposes of example, an amplifier 22, a mixer 23 and a demodulator circuit 24. The receiver part may instead comprise more than one amplifier and more than one mixer. Alternatively, there may be a zero IF receiver arrangement. The amplifier 22 has a channel monitor output 25 connected to a channel monitor circuit 26 such as a squelch detection circuit. Connected to the demodulator 24 is a microprocessor 30 which also receives the signal (e.g. an interrupt signal) 31 from the channel monitor circuit 26. The microprocessor comprises logic receiver circuitry 37 connected to a transmitter PTT function 36 via a preamble enable signal path 38. Connected to the microprocessor 30 is a transmitter part 29 comprising, byway of example, a modulator circuit 32, a mixer 33 and a power amplifier 34. There may of course be more than one mixer or more than one amplifier. Connected to the mixers 23 and 33 is a synthesizer or other frequency injection circuit 35.

An example of a modulation scheme performed by the modulator 32 and demodulated by the demodulator 24 is FSK modulation, but it will be appreciated that other modulations can be used and indeed the circuits 24 and 32 may be replaced by software in the microprocessor 30.

In operation a first RTU 10 receives a data transmission from a second RTU 12. A data transmission from the first RTU 10 is received at the antenna 19 of the second RTU 12, fed into the receiver circuitry 28 by the antenna switch or circulator 21. The receiver circuitry 28 demodulates the data transmission and provides the data stream for inputting to the microprocessor 30. The logic receiver function 37 operates in the link layer of the protocol (as known to one skilled in the art). Link layer protocols are well known in the art and need not be described in detail. In the case of an asynchronous system, the received data stream comprises a number of characters, each of which consists of a start pulse, a 7–8 digit binary sequence and an end pulse. Synchronous systems will have other arrangements that need not be described. The logic receiver 37 is able to detect when no more data has been transmitted by recognising the end-of-data indication 102. The end-of-data indication 102 preferably takes the form of an end pulse with no following start pulse or data. Once the end-of-data indication is recognised the logic receiver 37 then transmits an enable signal 38 to the transmitter PTT function 36 to initiate the short preamble of activity transmission 105 for maintaining the communications link with the first RTU 10 on the channel.

In order to access a channel for a first transmission the channel monitor circuit 26 recognises that a channel is free and transmits an interrupt signal 31 to the transmitter PTT function 36 in order to seize the channel. Once the channel has been accessed and communications have commenced the interrupt signal assumes a "don't care" state.

Thus a communications system is provided whereby periods of activity transmissions, transmitted by two communicating units, ensure that no third party contends for the channel being used for the communication.

We claim:

1. A method of operation of a communications unit in a communication system having communicating units arranged for communication over a contention channel, comprising the steps of:

detecting an end-of-data indication on the channel and commencing transmission in reply without waiting for cessation of transmission activity on the channel.

2. A method according to claim 1, comprising the step of terminating the data session, entering a contention mode, waiting for cessation of all transmission activity on the channel and contending for access to the channel after cessation of transmission activity before initiating a new data session and transmitting on the channel.

3. A method of operating a communication system comprising at least first and second communicating units arranged for communication over a communications channel, comprising the steps of:

at the first unit, transmitting data followed by an end-of-data indication, followed at least by a predetermined period of further transmission activity, at the second unit, detecting the end-of-data indication and commencing transmission in reply during the period of further transmission activity.

4. A method according to claim 3, comprising the step, at the second unit, of commencing data transmission in reply after the end of the further transmission activity of the first unit.

5. A method according to claim 3, wherein the commencement of transmission of the second unit does not include valid data until a period has expired approximately equal to the period of further transmission activity of the first unit.

6. A method according to claim 3, wherein the period between commencement of transmissions in reply and commencement of data transmissions (preamble time) is selectable depending upon the reply required.

7. A method according to claim 3, whereby the periods of further activity (transmission tails) used by the first communicating unit are selectable depending upon the reply expected.

8. A method according to claim 3, wherein the periods of (a) further activity used by the first communicating unit and (b) the period between commencement of transmissions in reply and commencement of data transmission (preamble time) are different in length.

* * * * *